No. 831,174.　　　　　　　　　　　　　　PATENTED SEPT. 18, 1906.
J. MULLINS.
BRAKE LEVER.
APPLICATION FILED FEB. 8, 1906.
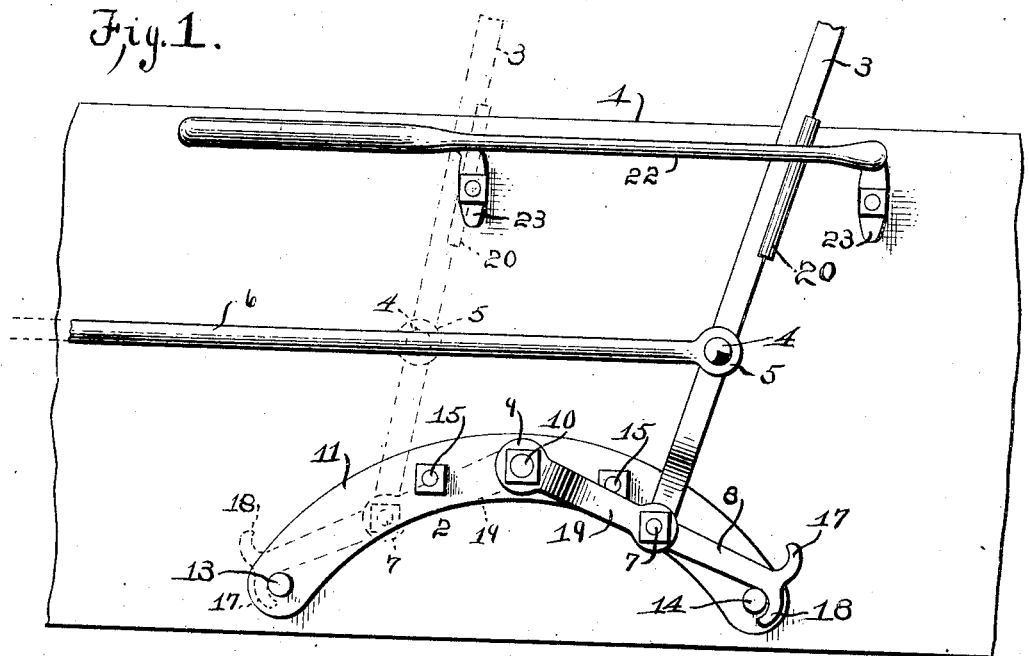
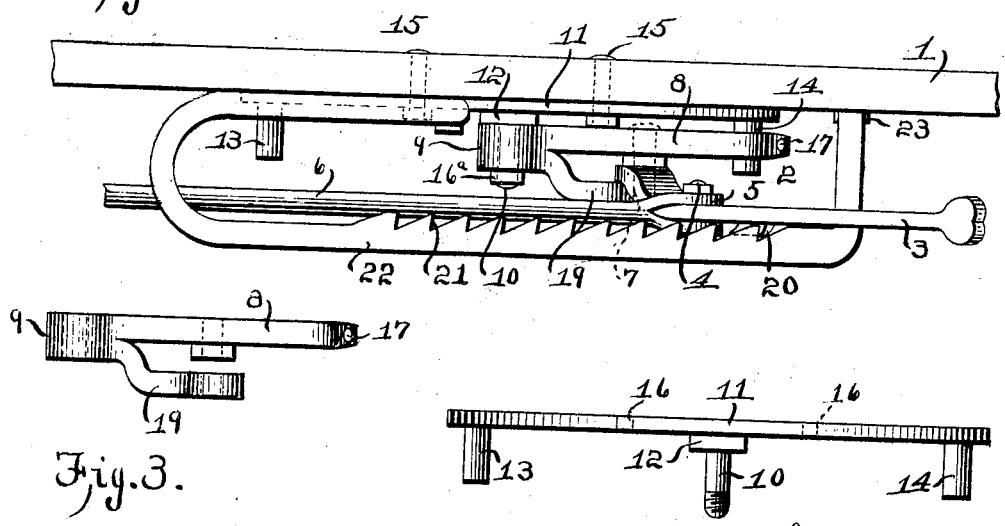
Witnesses　　　　　　　　　　　　　　　　Inventor
　　　　　　　　　　　　　　　James Mullins.
　　　　　　　　　　　　　　by
　　　　　　　　　　　　　　　　　　Attorneys
THE NORRIS PETERS CO., WASHINGTON, D. C.

UNITED STATES PATENT OFFICE.

JAMES MULLINS, OF ATCHISON, KANSAS.

BRAKE-LEVER.

No. 831,174.

Specification of Letters Patent.

Patented Sept. 18, 1906.

Application filed February 8, 1906. Serial No. 300,106.

*To all whom it may concern:*

Be it known that I, JAMES MULLINS, a citizen of the United States, residing at Atchison, in the county of Atchison and State of Kansas, have invented certain new and useful Improvements in Vehicle-Brakes; and I do declare the following to be a full, clear, and exact description of the invention, such as will enable others skilled in the art to which it appertains to make and use the same.

My invention relates to improvements in brakes for wagons and other vehicles; and it consists in the novel construction, combination, and arrangement of devices hereinafter described and claimed.

The object of the invention is to provide a brake of this character with an operating-lever having a shiftable fulcrum, so that the throw of the brake-shoe and rod may be increased or decreased as desired.

A further object of the invention is to improve and simplify the construction and operation of devices of this character, and thereby render the same more efficient and durable in use and less expensive to manufacture.

The above and other objects, which will appear as the nature of the invention is better understood, are accomplished by means of the construction illustrated in the accompanying drawings, in which—

Figure 1 is a side elevation of my improved vehicle-brake, showing the operating-lever and its shiftable fulcrum-carrying element in their two positions in full and dotted lines. Fig. 2 is a top plan view of the parts shown in Fig. 1. Fig. 3 is a detail view of the shiftable fulcrum-carrying element or link, and Fig. 4 is a detail view of the base-plate.

Referring to the drawings by numerals, 1 denotes a portion of one side of the body of a vehicle of any description, and 2 denotes my improved brake. The latter comprises an operating-lever 3, which has pivotally connected to it by a bolt or the like 4 the forward bifurcated end 5 of the brake-shoe rod 6. This rod has its rear end connected to a brake-shoe of any description. (Not shown.) The lower end of the operating-lever 3 is slightly offset and apertured to receive a pivot or fulcrum 7 upon a shiftable fulcrum-carrying element or link 8. The latter is pivoted at its enlarged apertured end 9 upon a pivot-stud 10, which projects outwardly from the center of a segmental-shaped base-plate 11. The pivot-stud 10 is preferably formed integral with an integral boss 12 upon the outer face of said base-plate, and the latter is formed at its ends upon its outer face with outwardly-projecting studs 13 14. The plate 11 is secured upon the wagon body or support 1 by bolts or similar fastenings 15, passed through openings 16 in said plate and alining openings in the body 1. The swinging element or link 8 is retained upon the pivot-stud 10 by a nut $16^a$, which is screwed upon its outer threaded end, as shown. The link or element 8 is formed at its outer or free end with oppositely-projecting hooks 17 18, which are adapted to respectively engage the studs 13 14, as shown in full and dotted lines in Fig. 1. The fulcrum 7 for the lever 3 is preferably in the form of a bolt, which is passed through an opening in the boss or enlargement formed on the outer face of the element or link 8, through an opening in the lower end of the lever 3, and a similar opening formed in an offset arm 19, which opening is preferably formed integral with the element or link 8 and is spaced from said boss to receive the lower offset end of the lever 3, as shown. The operating-lever is adapted to be locked or retained in an adjusted position by the engagement of a pawl 20, formed or secured upon it, with rack-teeth 21 upon a guide loop or bar 22, which has its downwardly-bent ends 23 bolted or otherwise secured upon the wagon-body 1, as shown.

The operation and advantages of the invention will be readily seen upon reference to Fig. 1 of the drawings, in which the two positions of the shiftable or swinging fulcrum-carrying element 8 are shown in full and dotted lines. By mounting the lever 3 in this manner it will be seen that the throw or movement of the brake-shoe and its rod 6 may be varied, so that the brake-shoe may be forced tightly against the brake-surface upon the wheel or held at a considerable distance from the same.

Various changes in the form, proportion, and the minor details of construction may be resorted to without departing from the principle or sacrificing any of the advantages of the invention as defined by the appended claims.

Having thus described my invention, what I claim as new, and desire to secure by Letters Patent, is—

1. The combination of a support, stops upon said support, a movable fulcrum-carrying element upon said support intermediate said stops and adapted to be moved into engagement with the same, a lever pivoted upon the fulcrum on said element, and an operating device connected to said lever, substantially as described.

2. The combination of a support, projections upon said support, a shiftable fulcrum-carrying element pivoted upon said support intermediate said projections and adapted to be swung into engagement with the same, a lever pivoted upon the fulcrum on said element, and an operating-rod connected to said lever, substantially as shown and described.

3. The combination of a base-plate, studs or projections thereon, a pivot-stud upon said plate intermediate said projections, a fulcrum-carrying element or link pivoted upon said pivot-stud and having oppositely-projecting hooks at its free end adapted to be swung into engagement with the projections upon said base-plate, a lever pivoted upon the fulcrum on said element, an operating-rod connected to said lever, and means for holding said lever in an adjusted position, substantially as described.

In testimony whereof I have hereunto set my hand in presence of two subscribing witnesses.

JAMES MULLINS.

Witnesses:
S. H. KIMBALL,
J. P. ADAMS.